Nov. 16, 1948.     T. E. M. CARVILLE     2,454,136
TWO-SPEED SINGLE-PHASE MOTOR
Filed Dec. 3, 1946                    2 Sheets-Sheet 1

WITNESSES:

INVENTOR
Theodore E. M. Carville
BY
ATTORNEY

Patented Nov. 16, 1948

2,454,136

UNITED STATES PATENT OFFICE 2,454,136

TWO-SPEED SINGLE-PHASE MOTOR

Theodore E. M. Carville, Lima, Ohio, assignor to Westinghouse Electric Corporation, East Pittsburgh, Pa., a corporation of Pennsylvania Application December 3, 1946, Serial No. 713,716

8 Claims. (Cl. 318—224)

1

The present invention relates to two-speed, single-phase, induction motors, and more particularly to a low-cost, two-speed, single-phase motor of either the split-phase or the capacitor-start type.

Single-phase induction motors of the split-phase and capacitor-start types have a main primary winding and an auxiliary, or starting, primary winding, which are displaced from each other on the stator of the motor, preferably by as nearly ninety electrical degrees as possible. The two windings carry currents which are displaced in phase, the phase difference being produced by the design of the windings in the split-phase motor, and by connecting a capacitor in series with the auxiliary winding in the capacitor-start motor. In starting such a motor, the two primary windings are connected in parallel to a single-phase supply line, and when the motor has accelerated to a predetermined speed, the auxiliary winding is disconnected by a speed-responsive starting switch, usually of the centrifugal type.

It is often necessary or desirable to be able to operate motors of this type at two different speeds, and two-speed single-phase motors have been built having two main windings, with different numbers of poles, and two auxiliary windings, one for use with each of the main windings. This requires a total of four primary windings, which involves some difficulty in winding the motor, and considerably increases the cost, as compared to that of a conventional single-speed motor. Two-speed motors have also been built having two main windings of different pole numbers and only one auxiliary winding adapted to cooperate with one of the main windings. A special starting switch is used arranged so that the motor always starts on the main winding with which the auxiliary winding cooperates, and after operation of the starting switch, the motor runs on either one of the main windings, as determined by a speed selector switch. This construction requires a special starting switch, which is undesirable, and which substantially increases the cost of the motor. Another arrangement for two-speed single-phase motors utilizes a single main winding and auxiliary winding, which are arranged so that the number of poles can be changed by changing the connections of the windings. This requires bringing a relatively large number of leads out of the motor, and requires a complicated and expensive external control switch for changing the winding connections to change the speed. Thus, all of these prior constructions for obtaining two-speed operation of single-phase motors require complicated windings or special switches and are relatively expensive.

The principal object of the present invention is to provide a two-speed, single-phase induction motor of either the split-phase or the capacitor-start type, which is relatively simple and which can be built at low cost.

Another object of the invention is to provide a two-speed, single-phase motor which utilizes only one auxiliary, or starting, winding and a standard starting switch, so that the necessity for elaborate and complicated windings or special starting switches is eliminated, and a simple low-cost construction is obtained.

A more specific object of the invention is to provide a two-speed single-phase motor utilizing two main windings of different pole numbers, but only one auxiliary, or starting, winding and a standard starting switch, the auxiliary winding being arranged so that it is capable of cooperating with either one of the two main windings to develop a starting torque.

The invention will be more fully understood from the following detailed description, taken in connection with the accompanying drawings, in which.

Figure 1:
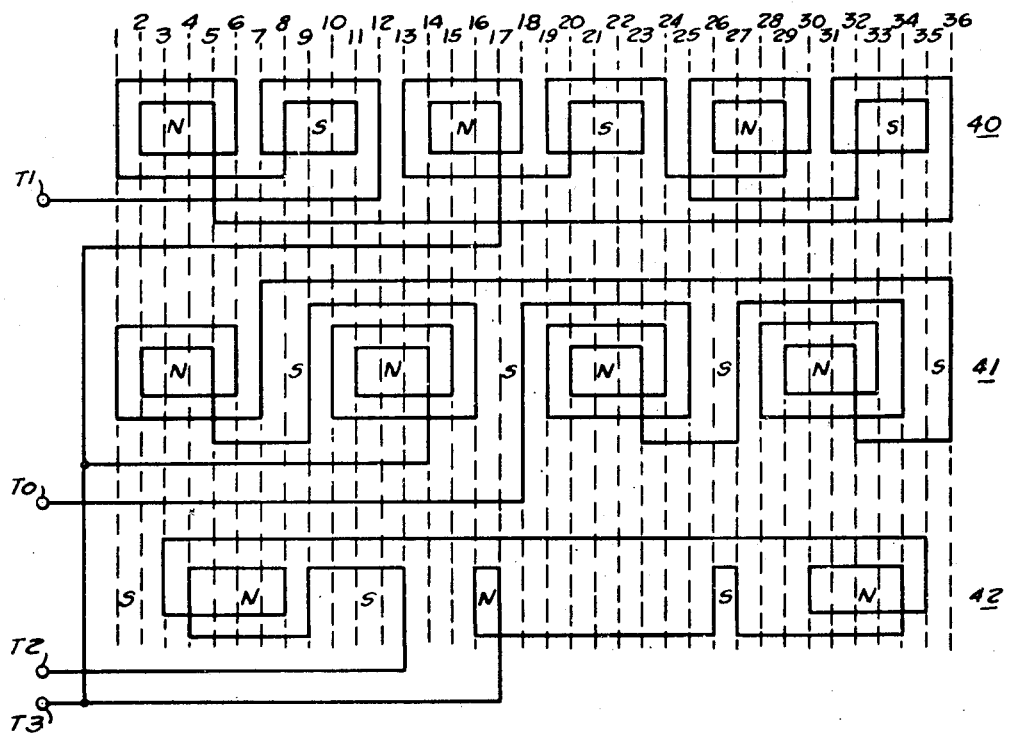
Figure 1 is a diagrammatic, developed view of the primary windings of a two-speed motor embodying the invention.

Fig. 1 shows an illustrative arrangement of the primary windings of a two-speed motor embodying the invention. The windings are shown developed, and for clarity in illustration, the three primary windings are shown separated, although it will be understood that they are actually superimposed in the same slots. The particular motor shown for the purpose of illustration has thirty-six slots in its stator core for reception of the windings, the slots being indicated by dotted lines and numbered 1 to 36 in Fig. 1. The motor has a six-pole high-speed main winding 40, and an eight-pole low-speed main winding 41, although it will be obvious that the invention is applicable to motors having other combinations of pole numbers.

The motor also has an auxiliary, or starting, winding 42, which cooperates with either one of the main windings, as explained hereinafter. The six-pole main winding 40, as shown in Fig.

1, is a concentric-coil winding of more or less conventional arrangement, although other types of six-pole windings might be used. Thus, each coil group, which forms one pole of the winding, consists of a suitable number of concentrically arranged coils, two coils being shown in each coil group. For example, the first coil group at the left of Fig. 1 consists of a coil lying in slots 2 and 5 and a coil lying in slots 1 and 6, the two coils being connected in series. Similarly, the next group consists of a coil lying in slots 8 and 11 and a coil lying in slots 7 and 12, the two coils being connected in series and wound in the opposite direction to the coils of the first group, so that the adjacent poles formed by these coil groups are of opposite polarity. Six coil groups similar to those described are provided and they are all connected in series between the terminal lead T1 and a common terminal lead T3. It will be apparent that a more or less conventional single-phase six-pole winding is thus provided, the instantaneous polarities at a particular instant being indicated on the drawing. Single-turn coils have been shown, but it will be understood that in an actual motor each coil will have as many turns as necessary, and each of the coil groups forming the successive poles of the winding may include more or less than two coils.

The low-speed eight-pole main winding 41 is shown as a consequent-pole winding with four coil groups, each consisting of three coils, although any suitable type of eight-pole winding might be used. One coil group of the illustrated winding consists of a coil lying in slots 2 and 5, a second coil lying in slots 1 and 6, and a third coil lying in slots 36 and 7, the three coils being concentrically arranged and connected in series. The other three coil groups are similar, and all four groups are connected in series between the terminal lead T0 and the common terminal lead T3. It will be observed that all the coils of this winding are wound in the same direction, so that all of the coil groups produce poles of the same polarity, and consequent poles of opposite polarity appear in the spaces between the coil groups, thus providing an eight-pole field, the instantaneous polarities, at a particular instant, being indicated on the drawing. It will also be observed that the two main windings 40 and 41 are disposed in the slots in such a manner that certain poles of the two windings are quite close together. Thus, for example, the north pole of the six-pole winding which has its center between slots 3 and 4 is aligned with the corresponding north pole of the eight-pole winding, and the south poles on opposite sides of these two poles, while not exactly aligned, are separated by substantially less than ninety electrical degrees of either winding. This relative positioning of the two main windings is not necessarily essential to the invention, but it facilitates the design of the auxiliary winding.

The auxiliary winding 42 is of unusual design, based on the fact that it is not necessary for the auxiliary winding to have the same number of poles as the main winding, in order to develop a starting torque. In accordance with the invention, therefore, the auxiliary winding is arranged to have poles which cooperate with certain poles of both main windings, so that the auxiliary winding will cooperate with either main winding to produce a starting torque. In the illustrated embodiment of the invention, the auxiliary winding includes a number of relatively wide coils and a number of relatively narrow coils. Thus, the particular winding shown in the drawings includes wide coils lying in slots 35 and 3, and in slots 9 and 13, which form poles of one polarity, and wide coils lying in slots 4 and 8, and in slots 30 and 34 which form poles of opposite polarity. The winding also includes narrow coils lying in slots 16 and 17, and in slots 26 and 27, respectively, which form poles of opposite polarity. All of the coils of the auxiliary winding are connected in series between a terminal lead T2 and the common terminal T3. Only a single turn of the winding has been shown, for simplicity, but it will be understood that the coils of the auxiliary winding will usually have a large number of turns, and a skein winding may desirably be used because of its low cost.

The wide coils of the auxiliary winding 42 are positioned so that the poles formed by them will cooperate with poles of either of the main windings to produce a starting torque. Thus, it will be seen from the drawing that the coil lying in slots 4 and 8 produces a pole having its center approximately in slot 6, which is substantially midway between the centers of adjacent poles of both the six-pole winding 40 and the eight-pole winding 41. Thus, this pole of the auxiliary winding is displaced approximately ninety electrical degrees from the nearest poles of either of the main windings, and a starting torque is produced when the auxiliary winding is energized simultaneously with either one of the main windings, if the necessary phase difference exists between the currents in the main and auxiliary windings. Similarly, the center of the pole of opposite polarity produced by the coil lying in slots 9 and 13 is substantially displaced from the centers of the nearest poles of either of the main windings, so that this coil also aids in producing a starting torque. The same is true of the poles formed by the other two wide coils of the auxiliary winding, which are positioned so that their centers lie between adjacent poles of either of the two main windings. Thus, all four of the wide coils of the auxiliary winding 42 are effective in producing starting torque in combination with either one of the two main windings 40 and 41. The two narrow coils of the auxiliary winding are almost in line with poles of the main windings and have little effect on the starting torque. These narrow coils are utilized for the purpose of getting sufficient wire into the winding to give it the necessary high resistance to obtain the required phase difference between the main and auxiliary winding currents, and they are wound to be of opposite polarity so as to more or less cancel each other.

Figure 2:
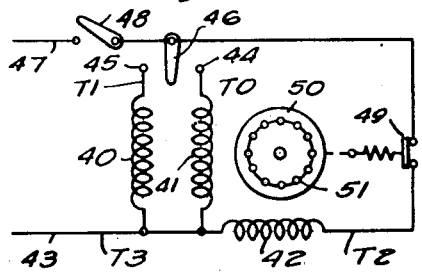
Fig. 2 is a schematic diagram showing the electrical connections of the motor.

The electrical connections of the motor are shown in Fig. 2. The common terminal T3, to which one end of each of the three primary windings is connected, is brought out of the motor as one line lead 43, for connection to a single-phase supply line. The terminals T0 and T1 of the main windings are connected to contacts 44 and 45, respectively, of a selector switch 46, which is connected to the other line lead 47 of the motor through a line switch 48. The other terminal T2 of the auxiliary winding 42 is connected to a speed-responsive starting switch 49, which may be of the usual centrifugal type, as indicated by a dotted connection to the rotor 50. The other side of the switch 49 is connected to the line lead 47 through the line switch 48. It will be apparent that the selector switch 46 and the line switch 48 might be combined, if desired, into a single switch having high-speed, low-speed and off positions. Any suitable type of rotor 50 may be utilized, preferably carrying a squirrel-cage secondary winding 51.

The operation of the motor should now be obvious. To start the motor on low speed, the selector switch 46 is placed on the contact 44 to connect the eight-pole winding 41 to the line, and as soon as the line switch 48 is closed, the motor will start because the arrangement of the auxiliary winding 42 is such that it will develop a starting torque with the eight-pole winding, as described above. The starting switch 49 opens in the usual manner to disconnect the auxiliary winding 42 when the motor reaches a predetermined speed, and the motor continues to run at its low speed. To operate the motor on high speed, the selector switch 46 is placed on the contact 45 to connect the six-pole winding 40 to the line, and the operation is then exactly the same as for the eight-pole winding, since the auxiliary winding is arranged so that it produces a starting torque with either one of the main windings. It will be obvious that the starting switch 49 must be adjusted to operate at a speed below the lower running speed of the motor.

The invention has been described with reference to six-pole and eight-pole main windings, but it is to be understood that it is not limited to this particular combination of pole numbers, but may be applied to any other desired combinations, such as two or four poles, or four and six poles. The main windings may be of any desired or usual type, and they are preferably disposed so that at least some of their poles are more or less in alignment, as explained above. The auxiliary winding may also be arranged in any suitable manner to have at least some of its coils disposed so that their centers lie between adjacent poles of both of the main windings, so as to be capable of developing a starting torque in combination with either one of the main windings. The invention is applicable either to split-phase motors, such as the motor shown for the purpose of illustration, or to capacitor-start motors in which a capacitor is connected in series with the auxiliary winding, the arrangement of the winding itself being the same in either case.

Figure 3:
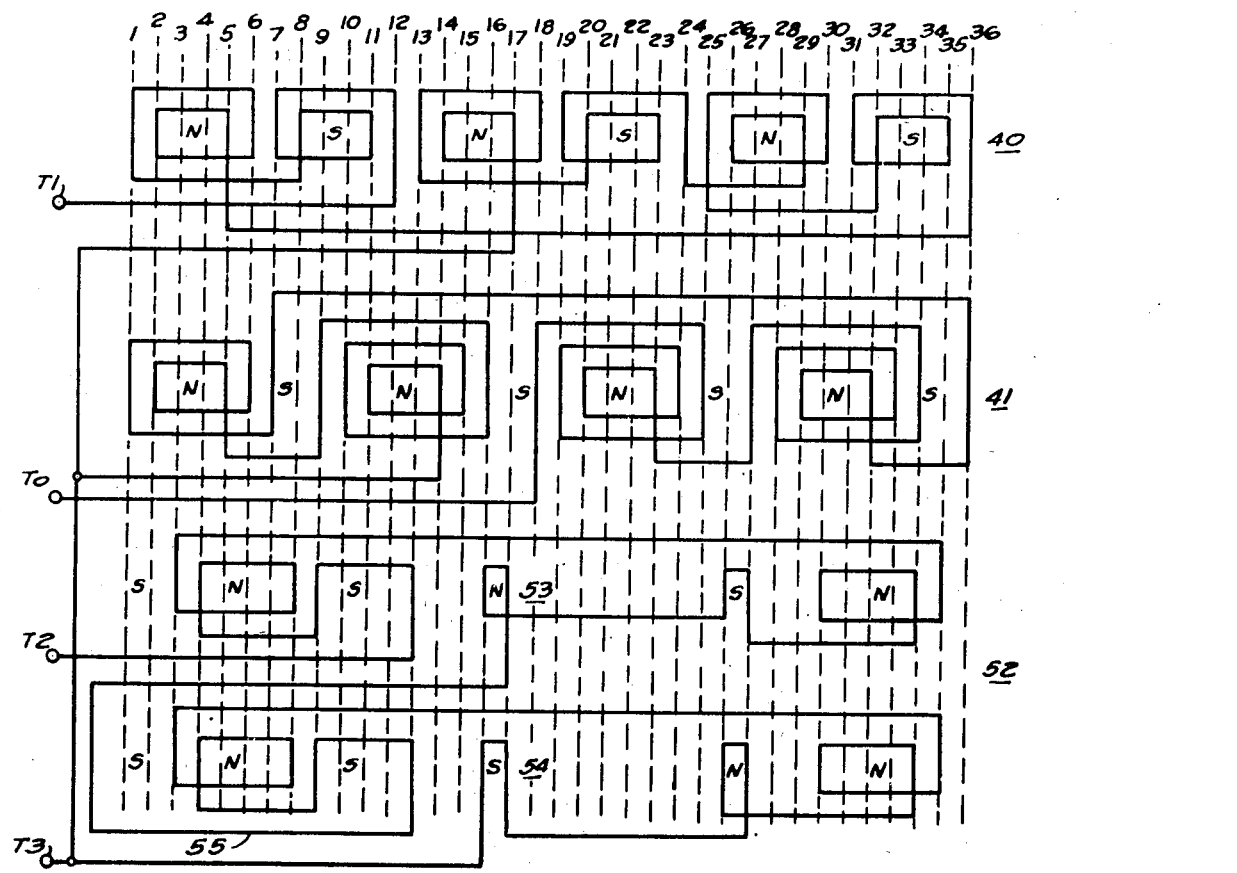
Fig. 3 is a diagram similar to Fig. 1 and showing a modified embodiment of the invention.

A modified form of the invention is shown in Figure 3. The six-pole and eight-pole main windings 40 and 41 shown in this figure are the same as those shown in Fig. 1, and described above. The auxiliary winding 52 shown in this figure, however, differs from that of Figure 1 in being divided into two similar sections. One section 53 of the auxiliary winding 52 is substantially the same as the auxiliary winding 42 of Fig. 1 described above, except that it may have only half as many turns. The other section 54 of the auxiliary winding 52 has the same number of wide coils as the section 53, disposed in the same slots, and wound in the same direction so as to be of the same polarity. The two narrow coils of the section 54 lie in the same slots as the narrow coils of the section 53, but are wound in the reverse direction so as to be of opposite polarity. The two winding sections 53 and 54 are connected in series by a conductor 55, and the complete winding 52 is connected between the terminal lead T2 and the common terminal lead T3.

The electrical connections of the motor are the same as those shown in Fig. 2, but in this embodiment of the invention, the narrow coils of the two winding sections carry current in opposite directions, so that their fluxes cancel and the resultant flux of these coils is substantially zero. This eliminates the field distortion in the motor which may be caused by the flux of the narrow coils in the arrangement of Fig. 1, and thus improves the starting performance of the motor. Since the wide coils of both sections of the winding 52 are wound in the same direction, their fluxes add, and the effect of the winding in developing starting torque with either one of the main windings is the same as described in connection with Fig. 1.

It should now be apparent that a two-speed single-phase motor has been provided which can be built at relatively low cost, since it requires only a single auxiliary primary winding and utilizes a standard starting switch. The auxiliary winding itself may be a skein winding, which is easily and quickly inserted in the slots, so that a low-cost winding is utilized in this motor. It will also be noted that it is only necessary to bring four leads out of the motor, the common lead T3, the leads T0 and T1 from the two main windings, and a lead from the starting switch. Thus, the external connections of the motor are simple and easily made.

A particular embodiment of the invention has been shown and described for the purpose of illustration, but it will be apparent that various other arrangements and combinations of windings are possible utilizing the same basic idea. It is to be understood, therefore, that the invention is not limited to the particular arrangement described above for the purpose of illustration, but in its broadest aspects it includes all embodiments and modifications which come within the scope of the appended claims.

I claim as my invention:

1. A single-phase induction motor having relatively rotatable primary and secondary members, a first main primary winding on the primary member, a second main primary winding on the primary member, said first and second main primary windings having different numbers of poles, means for alternatively connecting one or the other of said main primary windings to a single-phase supply line for operation of the motor at different speeds, a single auxiliary primary winding having a plurality of poles, said auxiliary winding being disposed on the primary member with at least some of its poles displaced from poles of the same polarity of both the first and second main windings, and means for energizing the auxiliary winding from said line.

2. A single-phase induction motor having relatively rotatable primary and secondary members, a first main primary winding on the primary member, a second main primary winding on the primary member, said first and second main primary windings having different numbers of poles, means for alternatively connecting one or the other of said main primary windings to a single-phase supply line for operation of the motor at different speeds, a single auxiliary primary winding having a plurality of poles, said auxiliary winding being disposed on the primary member with at least some of its poles displaced sufficiently from poles of the same polarity of both the first and second main windings to cause the motor to develop a starting torque when the auxiliary winding is energized simultaneously with either one of said main windings, and means for energizing the auxiliary winding from said line and for deenergizing the auxiliary winding when the motor reaches a predetermined speed.

3. A single-phase induction motor having a stator member and a rotor member, a first main primary winding on the stator member, a second main primary winding on the stator member, said first and second main primary windings having different numbers of poles and being adapted to be energized alternatively for operation of the motor at different speeds, an auxiliary primary winding on the stator member, said auxiliary winding comprising a plurality of coils connected together to form a single multipolar winding, at least some of said coils being disposed so that their centers lie between adjacent poles of both said first and second main windings, and means for energizing the auxiliary winding in parallel with either of the main windings.

4. A single-phase induction motor having a stator member and a rotor member, a first main primary winding on the stator member, a second main primary winding on the stator member, said first and second main primary windings having different numbers of poles, means for alternatively connecting one or the other of said main primary windings to a single-phase supply line for operation of the motor at different speeds, an auxiliary primary winding on the stator member, said auxiliary winding comprising a plurality of coils connected together to form a single multipolar winding, at least some of said coils being disposed so that their centers lie between adjacent poles of both said first and second main windings to produce a starting torque when the auxiliary winding is energized simultaneously with either one of the main windings, and means for energizing the auxiliary winding from said line and for deenergizing the auxiliary winding when the motor reaches a predetermined speed.

5. A single-phase induction motor having a stator member and a rotor member, a first main primary winding on the stator member, a second main primary winding on the stator member, said first and second main primary windings having different numbers of poles and being adapted to be energized alternatively for operation of the motor at different speeds, and an auxiliary primary winding on the stator member, said auxiliary winding comprising a plurality of coils connected together to form a multipolar winding, certain of said coils being relatively wide and others of said coils being relatively narrow, and said wide coils being disposed so that their centers lie between adjacent poles of both said first and second main windings.

6. A single-phase induction motor having a stator member and a rotor member, a first main primary winding on the stator member, a second main primary winding on the stator member, said first and second main primary windings having different numbers of poles, means for alternatively connecting one or the other of said main primary windings to a single-phase supply line for operation of the motor at different speeds, an auxiliary primary winding on the stator member, said auxiliary winding comprising a plurality of coils connected together to form a multipolar winding, certain of said coils being relatively wide and others of said coils being relatively narrow, and at least some of said wide coils being disposed so that their centers lie between adjacent poles of both said first and second main windings to produce a starting torque when the auxiliary winding is energized simultaneously with either one of the main windings, and means for de-energizing the auxiliary winding when the motor reaches a predetermined speed.

7. A single-phase induction motor having a stator member and a rotor member, a first main primary winding on the stator member, a second main primary winding on the stator member, said first and second main primary windings having different numbers of poles and being adapted to be energized alternatively for operation of the motor at different speeds, and an auxiliary primary winding on the stator member, said auxiliary winding comprising two similar sections connected in series, each of said sections consisting of a plurality of relatively wide coils and a plurality of relatively narrow coils connected together to form a multipolar winding, the two sections of the auxiliary winding being disposed with corresponding coils coinciding in position, corresponding wide coils of each section being wound in the same direction and corresponding narrow coils of each section being wound in opposite directions, and said wide coils being disposed so that their centers lie between adjacent poles of both said first and second main windings.

8. A single-phase induction motor having a stator member and a rotor member, a first main primary winding on the stator member, a second main primary winding on the stator member, said first and second main primary windings having different numbers of poles, means for alternatively connecting one or the other of said main primary windings to a single-phase supply line for operation of the motor at different speeds, an auxiliary primary winding on the stator member, said auxiliary winding comprising two similar sections connected in series, each of said sections consisting of a plurality of relatively wide coils and a plurality of relatively narrow coils connected together to form a multipolar winding, the two sections of the auxiliary winding being disposed with corresponding coils coinciding in position, corresponding wide coils of each section being wound in the same direction and corresponding narrow coils of each section being wound in opposite directions, at least some of said wide coils being disposed so that their centers lie between adjacent poles of both said first and second main windings to produce a starting torque when the auxiliary winding is energized simultaneously with either one of the main windings, and means for de-energizing the auxiliary winding when the motor reaches a predetermined speed.

THEODORE E. M. CARVILLE.

REFERENCES CITED

The following references are of record in the file of this patent:

UNITED STATES PATENTS

| Number | Name | Date |
|---|---|---|
| 1,859,369 | Kennedy | May 24, 1932 |
| 1,918,323 | Dederick et al | July 18, 1933 |